United States Patent Office 3,040,311
Patented June 19, 1962

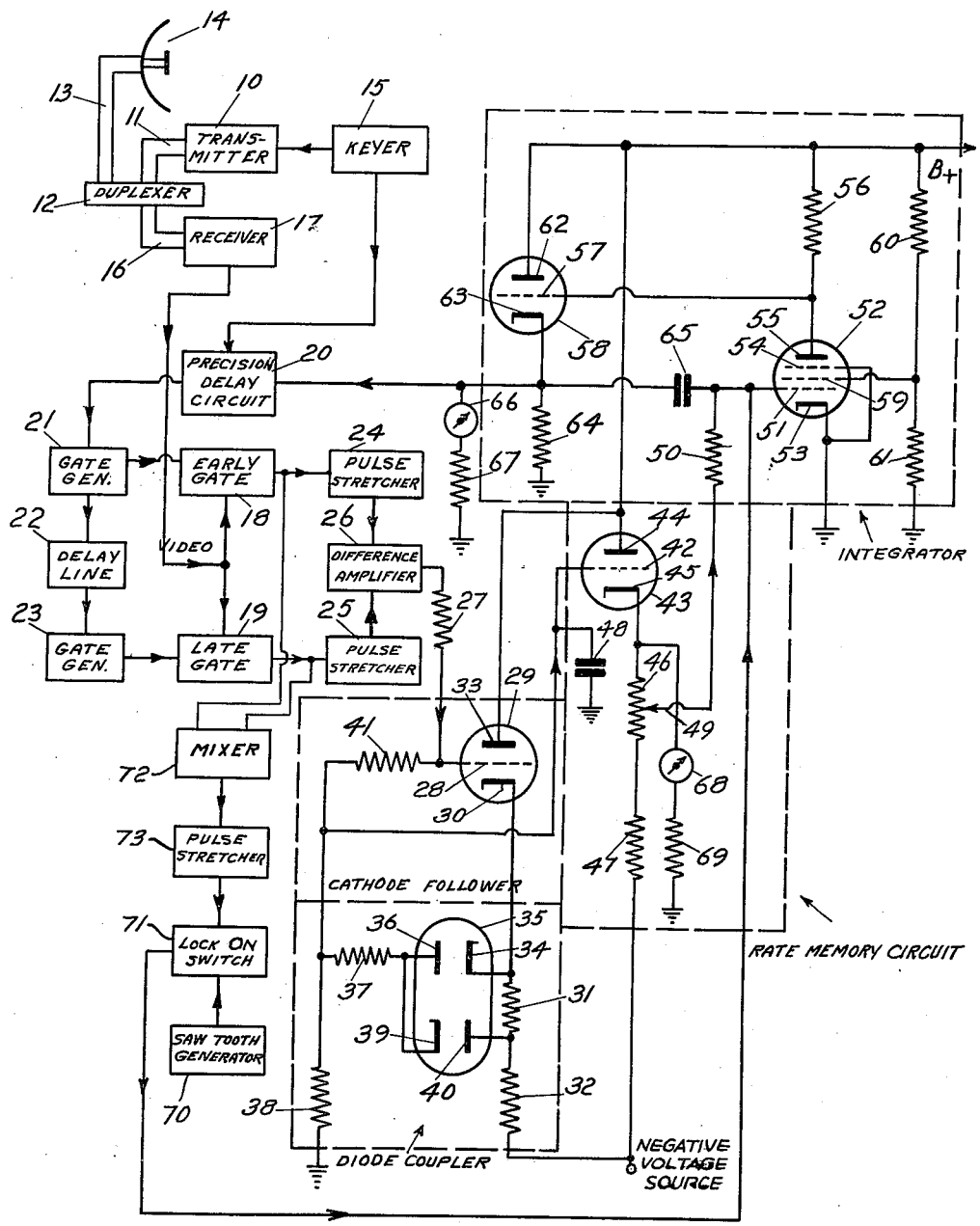

3,040,311
SERVO LOOPS
Carl A. Segerstrom, Winchester, Mass., assignor to Raytheon Company, a corporation of Delaware
Filed Oct. 5, 1950, Ser. No. 188,529
6 Claims. (Cl. 343—7.3)

This invention relates to distance-measuring systems, and more particularly to systems wherein the distance to an object is automatically measured and tracked.

In previous distance-measuring systems, automatic tracking circuits have been disclosed, these circuits comprising, for example, a pair of video gates slightly displaced in time which are adapted to operate one on either side of a reflected pulse signal. The outputs of these gates are, in turn, used to control a circuit which controls the time position of the gates to thereby maintain the time position of the gates constant relative to the reflected pulse signal independent of motion of the object producing the reflected pulse signal.

In modern applications of the distance-measuring equipment, it has become important to ascertain the velocity with which the object whose distance is to be measured is moving with respect to the measuring system. For example, if radar is being used to track a high-speed airplane, it is necessary in order to predict the future course of the airplane to know the relative velocity or rate of change of the distance between the airplane and the measuring system.

This invention discloses a circuit whereby the rate of change of the distance is obtained directly from the reflected pulse signal. Briefly, this is accomplished by comparing the signals passed by two gates which are positioned in time one on either side of the reflected pulse signal, and utilizing the difference to charge a condenser through a charging resistance. The charge on the condenser is then proportional to velocity. This velocity signal is then integrated again to produce a voltage which represents range or object distance. The range voltage is, in turn, used to control the time position of the gates, thus producing a servo loop wherein any error in time difference, with respect to the zero or radiated pulse signal position between the gate positions and the reflected signal pulse, is fed through the two integrating circuits to correct the error in the gate positions.

Since the rate of change of distance or velocity is an intermediate step required by the system to produce range, the accuracy of the velocity measurement will approach the accuracy of the range measurement, and moreover, will be locked in the servo loop, and thereby be driven to a condition of minimum error by the servo action.

In addition, this system discloses apparatus whereby velocity information for several pulses is memorized such that if the signal is relatively weak and sporadically fades, the system will continue to track the object at a given velocity. Thus, if the object is a moving aircraft which changes velocity relatively slowly, the chance of losing the tracked object during fading of the reflected signal pulses is substantially reduced. Briefly, this memory circuit comprises a diode-coupling arrangement which charges the rate condenser relatively rapidly through a low-coupling impedance, and when the signal fades, isolates the condenser from the low-impedance charging source such that the condenser can only discharge through a high resistance over a relatively longer period of time.

Other and further objects of this invention will be apparent as the description thereof progresses, reference being had to the accompanying drawing, wherein:

The single FIGURE illustrates a partial functional flow diagram, and a partial schematic diagram of a system embodying this invention.

Referring now to the drawing, there is shown a pulse type radar transmitter 10 which feeds energy through a wave guide 11, a duplexer 12, and a wave guide 13 to an antenna 14. Transmitter 10 is pulsed periodically by a keyer 15 which produces periodic trigger pulses in a well-known manner. The pulsed energy which may be, for example, within the radio frequency, high-frequency or microwave spectrum is radiated from antenna 14 and strikes an object which reflects energy pulses back to antenna 14 in a well-known manner. These pulses are fed from antenna 14 through wave guide 13, duplexer 12, and a wave guide 16 to a receiver 17 which may be of any desired type and may comprise, for example, R.F. and I.F. amplifiers and a detector. The output of receiver 17 comprises a video signal derived from the signal pulses reflected from the object. The video signal is fed into a pair of coincidence gates 18 and 19, respectively. These gates may be of any desired type such as, for example, pentodes, the video signal being fed to the grid thereof, and the output being derived from the plate circuits attached to the pentodes, said pentodes being rendered conductive and nonconductive by suitable pulses applied, for example, to the screen or suppressor grids thereof to produce the gating action in a well-known manner. When the pulses are applied to the screen or suppressor grids, the gates are opened or turned on and video pulses are fed through, while when the pulses are removed the tubes are rendered nonconductive and the video information is not passed.

The pulses which open the gates may be produced, for example, as follows. A precision delay circuit 20 is fed a trigger pulse from keyer 15 every time transmitter 10 is pulsed. This pulse is delayed for a predetermined amount of time by circuit 20, the delay being determined by a potential applied to one of the electrodes in the delay circuit 20. A circuit suitable for use is the so-called phantastron circuit. A suitable phantastron circuit is more completely described on page 197 of vol. 19 of the Radiation Lab. Series, entitled "Waveforms," published in 1949 by McGraw-Hill Book Company. By varying the potential applied to the electrode, the delay time may be decreased or increased, as desired. The delayed trigger pulse is fed to a gate generator 21 which may be, for example, a gaseous-discharge device with associate circuits, which produces a rectangular pulse of a predetermined duration, for example, a fraction of a microsecond. The output of the gate generator 21 is fed to the first of the coincidence gates 18 which may be termed the early coincidence gate. The pulse output of gate generator 21 is also fed through a delay line 22 of short time duration, for example, a fraction of a microsecond, to a second gate generator 23 similar to gate generator 21. The output of gate generator 23, which is a rectangular pulse, is used to gate the coincidence gate 19 which may be termed the late coincidence gate.

The outputs of gates 18 and 19 are fed, respectively, through pulse stretchers 24 and 25 to a difference amplifier 26. Pulse stretchers 24 and 25 may be, for example, simple peak detectors with filter circuits attached to the outputs thereof, these circuits tending to smooth out the pulses produced by the gates 18 and 19 into substantially continuous varying direct current potentials. The difference amplifier, in effect, subtracts one signal amplitude from the other and amplifies the difference. It may be, for example, a pair of tubes connected, in series, between a source of negative potential and a source of positive potential with the input signals from the gates fed to the grids, the output signals being taken from the junction of the cathode of one of the tubes and the plate of the other tube. As shown here, the output of the difference amplifier 26 is fed through an isolating resistor 27 to the grid 28 of a cathode follower tube 29.

The cathode 30 of the cathode follower 29 is connected through resistors 31 and 32 to a source of negative potential, and the plate 33 thereof is connected to B+. The cathode 30 of cathode follower 29 is also connected to one cathode 34 of a duo-diode 35. The plate 36 of the duo-diode, which cooperates with the cathode 34, is connected through a resistor 37 and a resistor 38 to ground. The plate 36 is also connected to the other cathode 39 of the duo-diode 35. The other plate 40 thereof is connected to the junction between resistors 31 and 32. The junction between resistors 37 and 38 is connected through a resistor 41 to the grid 28 of the cathode follower 29, and also to the grid 42 of a cathode follower 43. The plate 44 of cathode follower 43 is connected to B+. The cathode 45 thereof is connected through a potentiometer 46 and a resistor 47 to a source of negative potential. The grid 42 is also connected to ground through a condenser 48.

The tap 49 of potentiometer 46 is connected through a resistor 50 to the grid 51 of a pentode 52. The cathode 53 of tube 52 is connected to ground, as well as the suppressor grid 54 thereof. The plate 55 of tube 52 is connected to B+ through a plate load resistor 56, and to the grid 57 of cathode follower tube 58. The screen grid 59 of tube 52 is connected to B+ through a voltage-dropping resistor 60, and to ground through a resistor 61. Plate 62 of cathode follower 58 is connected to B+, and cathode 63 thereof is connected to ground through a load resistor 64. The cathode 63 is also connected to grid 51 through a charging condenser 65, and to the precision delay circuit 20 to supply the varying D.C. potential thereto which determines the amount of delay produced by circuit 20.

The voltage appearing at cathode 63, which corresponds to range, is measured by a meter circuit comprising a meter 66 connected to cathode 63 and through a meter resistor 67 to ground. Similarly, the voltage of cathode 45, which indicates velocity, is measured by a meter circuit comprising a meter 68 connected to cathode 45 and through a meter resistor 69 to ground.

The operation of this servo tracking circuit will now be described. The keyer circuit 15 generates periodic pulses which trigger the transmitter 10 to produce short bursts of high-frequency energy which are fed through the duplexer 12 to the antenna 14 and radiated therefrom. These bursts of energy, upon striking an object, are reflected back to the antenna 14 and pass through the duplexer 12 to the receiver 17 where they are amplified and detected to produce a video signal. Pulses from the keyer 15 are also passed through precision delay circuit 20 and are delayed a predetermined amount of time, the amount of the delay corresponding to a particular unidirectional voltage fed into delay circuit 20 from cathode 63.

The output of delay circuit 20 then triggers gate generator 21 which, in turn, triggers gate generator 23 which is delayed slightly from gate generator 21. Gate generators 21 and 23 then gate coincidence gates 18 and 19, respectively. The duration of these gate open periods may be on the order of a microsecond, and, in effect, takes samples from the video information, these samples corresponding to a particular range of an object-reflecting signal pulse. Thus, it may be seen that by varying the delay of precision delay circuit 20, the video information out of gates 18 and 19 may be made to sample reflected signal pulses from the various object ranges.

Since the video information is smoothed through the pulse stretchers 24 and 25, the output of the difference amplifier 26 represents a substantially continuous signal and varying in both amplitude and polarity. If an object signal appears in early gate 18 more strongly than in late gate 19, the output from the difference amplifier 26 will be of one polarity, while if the signal is stronger in late gate 19 than in early gate 18, the signal will be of the other polarity. This signal, upon being fed through cathode follower 29 and diode coupler 35, charges the velocity memory condenser 48 as follows.

If the grid 28 of cathode follower 29 moves positive, the plate 40 of diode coupler 35 also moves positive drawing current from cathode 39 thereof, thus creating an increased potential between cathode 39 and ground. This increased potential is used to charge condenser 48 through charging resistor 37 at a rate determined by the values of resistor 37 and condenser 48 and the potential of cathode 39. Thus, it may be seen that resistor 37 and condenser 48 are in effect, an integrating circuit which integrates the information appearing at the output of the difference amplifier 26. Since the information produced at the output of the difference amplifier 26 corresponds to acceleration as will be demonstrated in greater detail presently, integration of this information with respect to time by the integrating circuit comprising resistor 37 and condenser 48 will produce a signal which corresponds to velocity. The magnitude of the signal is read by meter 68 which may be calibrated to read velocity, and may also be fed to a computer, not shown, for use in predicting trajectories of aircraft bombs or other missiles.

The velocity information is fed through the cathode follower 43 to potentiometer tap 49, and thence through a resistor 50 to the grid 51 of the tube 52. Since the grid 51 of tube 52 has a condenser 65 connected therefrom to the cathode 63 of a cathode follower whose grid 57 is connected to the plate 55 of tube 52, the condenser 65 may be considered electrically as connected directly between plate 55 and grid 51. Since the plate load of tube 52 is resistive, the condenser 65 effectively reflects back into the grid circuit of tube 52 a capacitance according to the well-known Miller effect which is equal to the value of the grid to plate capacitance multiplied by the quantity 1+the amplification of the tube 52 and associated circuit. This reflected capacitance, together with the resistor 50, constitutes a second integrating circuit which integrates the velocity information found at the cathode 30 into distance information which appears at grid 51 and is fed through plate 55 thereof, and hence through the cathode follower 57 to the precision delay circuit 20.

If an object signal appears more strongly in early gate 18 than in late gate 19, the signal is fed through the integrators and amplifiers to produce an output to precision delay circuit 20 which will decrease the delay, thus causing the object signal to appear equally in both early and late gates 18 and 19. When this occurs, the output signal, upon being integrated, produces no change in the output voltage fed to precision delay circuit 20. However, if the object moves, more video information will be fed through one gate than the other, thus producing a signal output from the difference amplifier 26 which is integrated through the various circuits, and is fed back to the precision delay circuit 20 to correct the difference. Thus, it may be seen that the precision delay circuit, the gate generators, concidence gates, pulse stretchers, difference amplifier, and the cathode follower of the integrating circuits form a closed servo loop. This loop is designed with sufficient gain so that an extremely small signal output from the difference amplifier 26 will produce a large enough voltage output from the cathode follower 57 to track the objects within the desired distance searched by the radar.

Since the servo loop has high gain, the servo information which is fed back through precision delay circuit 20 will cause extremely close tracking.

Since the signal appearing at the output of cathode follower 57 is range information, and since this information was obtained by integration of a signal, by the integrator comprising resistor 50 and condenser 65 and associated circuits, the signal feeding this integrator must substantially be the differential of the range information, or, in effect, velocity.

Since the integrating circuits used throughout this system are basically resistance-capacitance integrators which behave as true integrators, when the input signal to the integrator is substantially longer than the output signal, the effective time constants of the various integrators relative to each other become important in causing the integrating circuits to behave as integrators for the desired information.

In this series system, position or range will change at the slowest rate, and hence, the integrator used to produce this range must have the longest time constant. Velocity or rate of change of position can change more rapidly than position, and hence, the time constant of the integrator, condenser 48 and resistor 37 producing velocity may be made much less than the time constant of the range-producing integrator.

Thus, it may be seen that by the use of resistance-condenser integrators having appropriate time constants, the velocity-producing integrator will eliminate substantially all acceleration signals from the output of the velocity-producing integrator, and the range-producing integrator will eliminate substantially all velocity signals from the output thereof. Moreover, since the range-producing integrator of this system has a high input impedance, range information is substantially prevented from feeding back to the velocity-indicating meter 68 to produce an error therein. Meter 68, as shown here, may be, for example, a simple current-measuring meter which measures the currents through a resistor 69, and hence, measures the voltage drop thereacross.

Since the resistance-capacitance integrators are, in effect, frequency-responsive filters of the low-frequency passage type, the system will produce the most accurate velocity measurement at the higher velocities. Thus, it may be seen that this system is particularly adapted to accurately track and measure the velocity of high-speed missiles.

This system is adapted to operate, and the system will automatically search for an object and then lock on said object. The search and lock-on functions will now be described. However, a more detailed description may be had by referring to my copending application, Serial No. 188,528, filed October 5, 1950, now U.S. Patent No. 2,915,747. In the absence of a signal, a saw-tooth generator 70 generates a saw-tooth wave form which is fed through a lock-on switch 71 to grid 51 of tube 52, and hence, to precision delay circuit 20. This saw-tooth wave form is of a relatively slow repetition rate such that the gates are moved slowly over the object ranges, for example, at such a rate that approximately six reflected signals will pass through the gates from any particular object during passage of the gates through their range. When a signal is picked up by either of the gates, it is fed through a mixer 72 comprising an amplifier having separate input grids for the signals from each gate. The output of mixer 72 is fed through a pulse stretcher 73 which may be, for example, a detector and a filter network. The output of pulse stretcher 73 is used to operate lock-on switch 71 which deenergizes the saw-tooth 70, and allows signal information from the difference amplifier 26 to control the output of cathode follower 57, thus causing the system to track.

This completes the description of the particular embodiment of the invention illustrated herein. However, many modifications thereof will be apparent to persons skilled in the art without departing from the spirit and scope of this invention. For example, additional amplifiers may be added to the servo loop where desired, in order to increase accuracy of tracking and velocity measurement. The system is not necessarily limited to distance-measuring equipment, but could be used in various other systems where information signals are tracked or measured. Accordingly, it is desired that this invention be not limited to the particular details as described herein, except as defined by the appended claims.

What is claimed is:
1. A servo loop comprising a source of signals and a signal reference, means for comparing signals from said source with said signal reference, means for actuating said servo loop in response to a signal input to said comparing means, means for integrating the output of said comparing means to produce a signal indicative of the rate of change of the control signal of said servo loop, indicating means fed by said signal indicative of the rate of change of the control signal of said servo loop, and additional means for integrating the rate of change signal to produce a control signal for said servo loop.

2. A servo loop comprising a source of signals and a signal reference, means for comparing signals from said source with said signal reference, means for actuating said servo loop in response to a signal input to said comparing means, means for integrating the output of said comparing means to produce a signal indicative of the rate of change of the control signal of said servo loop, additional means for integrating the rate of change signal to produce a control signal for said servo loop, and means for amplifying said control signal.

3. A servo loop comprising a source of signals and a signal reference, means for comparing signals from said source with said signal reference, means for actuating said servo loop in response to a signal input to said comparing means, means for integrating the output of said comparing means to produce a signal indicative of the rate of change of the control signal of said servo loop, and means for memorizing said rate of change signal.

4. A servo loop comprising a source of signals and a signal reference, means for comparing signals from said source with said signal reference, means for actuating said servo loop in response to a signal input to said comparing means, means for integrating the output of said comparing means to produce a signal indicative of the rate of change of the control signal of said servo loop, visual indicating means fed by said signal indicative of the rate of change of the control signal of said servo loop and means for memorizing said rate of change signal comprising a diode coupler.

5. A servo loop comprising a source of signals and a signal reference, means for comparing signals from said source with said signal reference, means for actuating said servo loop in response to a signal input to said comparing means, means for integrating the output of said comparing means to produce a signal indicative of the rate of change of the control signal of said servo loop, and means for memorizing said rate of change signal comprising a diode coupler feeding said integrating means.

6. A servo loop comprising a source of signals and a signal reference, means for comparing signals from said source with said signal reference, means for actuating said servo loop in response to a signal input to said comparing means, means for integrating the output of said comparing means to produce a signal indicative of the rate of change of the control signal of said servo loop, and additional means for integrating the rate of change signal to produce a control signal for said servo loop, the time constant of said additional integrating means being substantially greater than the time constant of said first integrating means.

References Cited in the file of this patent

UNITED STATES PATENTS

| | | |
|---|---|---|
| 2,268,587 | Guanella | Jan. 6, 1942 |
| 2,461,144 | Cook | Feb. 8, 1949 |
| 2,461,871 | Bass | Feb. 15, 1949 |
| 2,468,703 | Hammel | Apr. 26, 1949 |
| 2,482,544 | Jacobsen | Sept. 20, 1949 |
| 2,516,356 | Tull et al. | July 25, 1950 |
| 2,538,027 | Mozley et al. | Jan. 16, 1951 |
| 2,543,072 | Stearns | Feb. 27, 1951 |
| 2,563,902 | Yost | Aug. 14, 1951 |
| 2,639,419 | Williams | May 19, 1953 |